(12) United States Patent
Maatta et al.

(10) Patent No.: US 7,054,147 B2
(45) Date of Patent: May 30, 2006

(54) DOUBLE ARTICULATED HINGE MECHANISM FOR ELECTRONIC DEVICES

(75) Inventors: Esa Maatta, Viiala (FI); Timo Herranen, Viiala (FI)

(73) Assignee: Nokia Corporation, Espoo (FI)

( * ) Notice: Subject to any disclaimer, the term of this patent is extended or adjusted under 35 U.S.C. 154(b) by 134 days.

(21) Appl. No.: 10/660,463

(22) Filed: Sep. 11, 2003

(65) Prior Publication Data

US 2005/0055807 A1    Mar. 17, 2005

(51) Int. Cl.
*G06F 1/16*    (2006.01)

(52) U.S. Cl. ................. 361/681; 361/683; 16/368; 16/386; 16/387; 174/135; 174/156

(58) Field of Classification Search ............. 361/681, 361/683; 16/368, 386, 387; 174/156, 135
See application file for complete search history.

(56) References Cited

U.S. PATENT DOCUMENTS 4,825,395 A    4/1989    Kinser, Jr. et al.
6,437,973 B1 *    8/2002    Helot et al. ................. 361/681

* cited by examiner

*Primary Examiner*—Jinhee Lee
(74) *Attorney, Agent, or Firm*—Alfred A. Fressola; Ware, Fressola, Van Der Sluys & Adolphson, LLP

(57) ABSTRACT

The present invention relates to hinge mechanisms for electronic devices with folding casings and to a double articulated hinge mechanism for aforesaid electronic devices offering advantageous characteristics for electric conductors to be passed through the inventive hinge mechanism. The mechanism allows pivoted junction of at least two casing parts constituting a folding casing of an electronic device, wherein each casing part includes electric components. The hinge mechanism has at least a hinge body component and a flexible electrical conductor for connecting the electronic components included by different casing parts. The hinge body component enables establishing two independent, substantially parallel and at a predefined distance separated pivot axes. Further the hinge body component provides a passage, which is adapted to receive the flexible electrical conductor for being routed though the hinge mechanism. Due to the passage, the flexible electrical conductor is held permanently in a predefined shape of the passage.

26 Claims, 4 Drawing Sheets

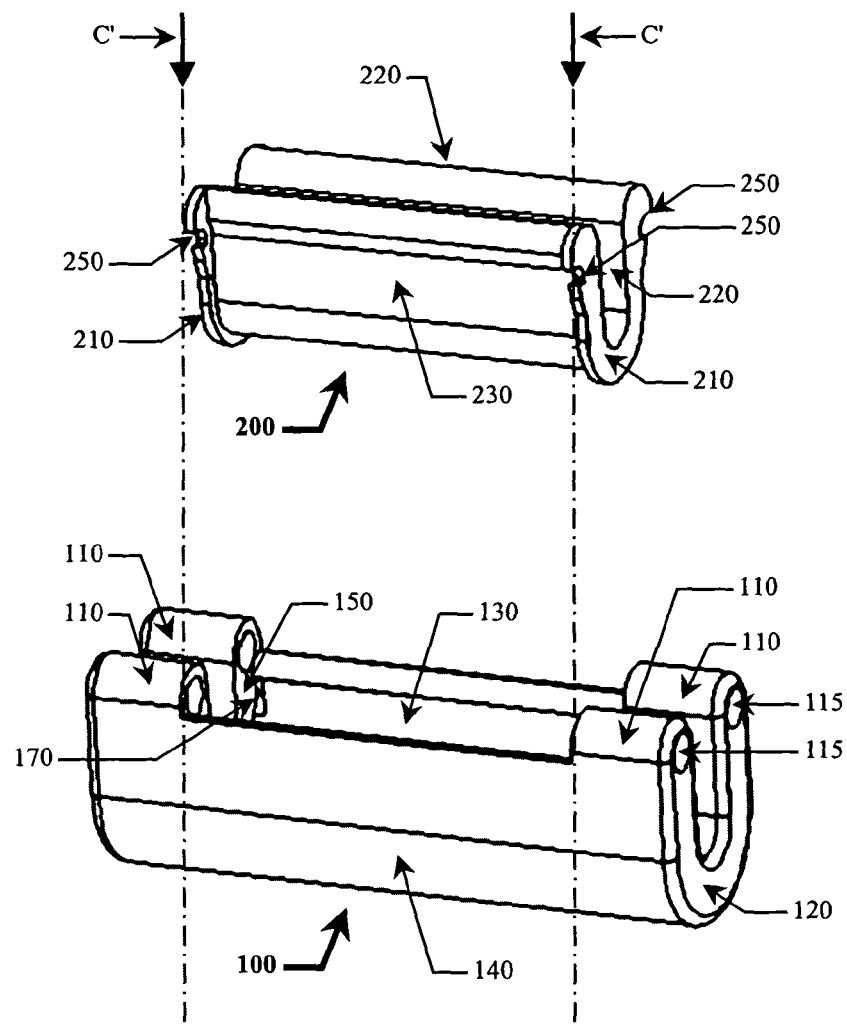
Fig. 2b
Fig. 2c
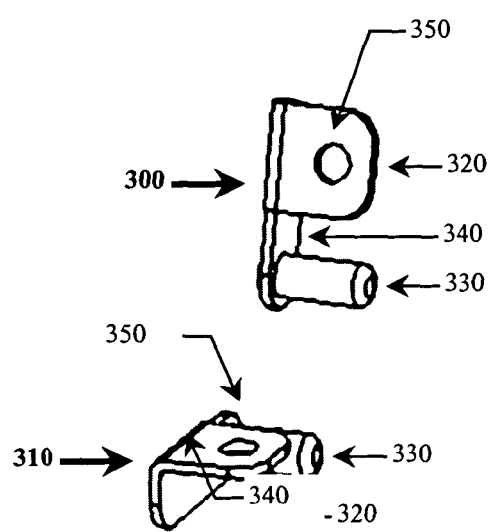
Fig. 2d

DOUBLE ARTICULATED HINGE MECHANISM FOR ELECTRONIC DEVICES

FIELD OF THE INVENTION

The present invention relates to hinge mechanisms for electronic devices with two-piece folding casings and in particular the present invention relates to a double articulated hinge mechanism for aforesaid electronic devices offering advantageous characteristics for electric conductors to be passed through the subject hinge mechanism.

TECHNICAL BACKGROUND

The advantages of a design of electronic devices having foldable casings or so called "folding casings" is well known especially in the field of mobile and portable electronic devices, respectively. The advantages refer primarily to the usability of such electronic devices that are formed of two casing halves, which are pivoted by a hinge mechanism joining the two casing halves with each other. A folding casing may have at least two folding positions, i.e. a close position, in which the both casing halves are stacked on the top of each other, and an open position, in which the casing halves' surfaces facing towards each other in the closed state, are exposed to a user. The close position offers an advantageous shape for carrying the device by a user, whereas the open position allows for presenting a relative large area to the user for implementing operating/control components such a keyboards, keypad, joysticks, touchpads etc. and for display components. Moreover, these components, which are presented to a possible user in the open position of the electronic device, are protected against external influences in the close position. Conventionally, a main body representing a first casing half implements electronics and operating/control components, while a top body representing a second casing half implements display components. Such aforementioned electronic devices with folding casings are known and employed for laptop and notebook computers, mobile phones, digital personal assistants, mobile communicators etc. only to list a selection of examples.

The hinge mechanism which provides for the junction of the casing halves and which allows for pivoting about at least one pivot axis is subject to several functional constraints. One constraint is focused by the design of the hinge mechanism itself and a second main problem emerging with the enabling of traversing electrical conductors through the hinge mechanism to have electrical connectivity between electrical and electronic components, respectively, implemented in the casing halves.

A flexible material in form of a strip, flap etc. may allow realization of the hinge mechanism itself. Such a design of the hinge mechanism itself enables the pivoted operating of the hinge mechanism but this design is subjected to wear by the pivoting movements in parallel such that this design may only allow for a limited number of pivoting movements (up to a maximum of several hundreds). More stable against frequent use are hinge mechanisms, which are provided with articulated hinges with articulated axles.

The electrical conducting between two casing halves through the hinge mechanism is conventionally accomplished by flexible printed circuits (FPC), which are indeed printed wire boards (PWB), being manufactured from a flexible board material. Concerns refer to the electrical conductor and especially the mechanical stress applied thereto due to the bending and pivoting movements, respectively, as well as the protection of the electrical conductor against injury from external influences.

The bending radius of the electrical conductor determines the mechanical stress that can be applied to the electrical conductor by bending and pivoting movements. The bending radius is further determined by the dimensions of the hinge mechanism, which is primarily determined by the dimension constraints set by the size of the electronic device with folding casings. The smaller the dimensions of the electronic device, the smaller the dimensions of the hinge mechanism and therefore the smaller the bending radius such that consequently, mechanical stress, torsion, compressing, tension, etc. of the electrical conductor increases with decreasing the bending radius. The electrical conductor has to withstand the mechanical deformation effected by the bending movements applied thereon each time the hinge mechanism is operated and in particular the electrical conductor has to exhibit the ability to resist breakage thereof also after frequent bending cycles.

Furthermore, the electrical conductor has to be protected against accidental damage applied thereon from outside of the electronic device when the electronic device is in open position. A simple solution of this concern is to protect the electrical conductor by a covering such with a flap of flexible resistant protective material. But a simple coverage is normally not sufficient to protect against puncturing, cutting and any similar effects by sharp and pointed objects, respectively.

The U.S. Pat. No. 4,825,395 discloses a hollow articulated hinge mechanism, which allows for routing electrical conductors therethrough. The articulated hinge mechanism is designed to enable one half of the two-piece folding casing to be rotated by one full revolution about the other half of the two-piece folding casing. The electrical conductors are subjected to distributed torsional stress during rotation movements which is taught by the U.S. Pat. No. 4,825,395 to be superior to locally concentrated stress of compression and tension. The design of the disclosed hollow articulated hinge mechanism might be advantageous over conventional solutions enlightened above but has disadvantages, which contradict a common use. The space within the hollow articulated hinge mechanism for accommodating electrical conductors is limited due to the specific routing of the electrical conductors therethrough. Consequently, the number of electrical conductors is restricted. Moreover, the torsional deformation of the electrical conductors within the hollow articulated hinge mechanism also limits the number of electrical conductors to be routed through such that the concept of U.S. Pat. No. 4,825,395 is not universally applicable in the field of electronic devices with folding casings.

OBJECTS OF THE INVENTION

Generally in view of the above-presented introduction the present invention refers to an improved hinge mechanism, which is advantageous over the explained state of the art.

In detail, a first object of the present invention is to provide a hinge mechanism that delimits bending radii of electrical conductors routed through the hinge mechanism. As aforementioned, the delimiting of the bending radii is essential for guaranteeing a high frequent utilization of the hinge mechanism without having a high rate of wear, to which flexible conductors are subjected during bending.

A second object of the present invention is to provide a hinge mechanism with inner side and outer side covering, which protect flexible conductors routed through the hinge mechanism such that damaging and wearing out effects caused by environmental influences, i.e. manipulations, operations, impacts etc. caused from the outside of the hinge mechanism, are prevented.

A third object of the present invention is to provide a hinge mechanism, which allows for designing frictional effects, which counteract opening and closing events without requiring supplementary components.

A superordinate object of the present invention is to provide a hinge mechanism, the components of which are manufactured and are assembled to the aforesaid hinge mechanism in an economic way. The economic manufacturing of the hinge mechanism may be obtained by components with a simple design, which may be put together quickly and easily.

SUMMARY OF THE INVENTION

The objects of the present invention are solved by a hinge mechanism, for a folding casing of an electric device consisting of at least two casing parts, each of said casing parts including electric components, comprising at least a hinge body component and flexible electrical conductor means for connecting said electric components included by different casing parts, wherein said hinge body component provides two pivot axes, which are separated at a predefined distance and said hinge body component provides a passage for accepting said flexible electrical conductor means. Another object of the present invention is an electric device with a folding casing being constituted by at least two casing parts, which are joined by a hinge mechanism comprising at least a hinge body component and flexible electrical conductor means for connecting said electric components included by different casing parts, wherein said hinge body component provides two pivot axes, which are separated at a predefined distance, and said hinge body component provides a passage for accepting said flexible electrical conductor means. Embodiments of the inventive hinge mechanism and the inventive electric device with hinge mechanism are defined in the dependent claims.

An advantageous shape of the hinge mechanism according to the present invention serves for protecting electrical flexible conductors from being damaged due to bending and from being damaged due to external effects.

According to an aspect of the invention, a hinge mechanism is provided, which allows pivoted junction of at least two casing parts of an electric device embodied as a folding casing. The casing parts include electric components. The hinge mechanism comprises at least a hinge body component and flexible electrical conductor means for connecting the electric components included by different casing parts. The hinge body component comprises two independent at predefined distance spaced pivot axes. Further the hinge body component provides a passage, which is designed and adapted to receive the flexible electrical conductor means for being routed though the hinge mechanism from one casing part to the other casing part. When the folding casing is in any open position (i.e. not closed) the flexible electrical conductor means comprises two bending portions, within which the flexible electrical conductor means are bent corresponding to the pivot movement about the pivot axes. Especially, a bending of the flexible electrical conductor means caused by pivot movement of the folding casing may exclusively occur within the aforementioned two bending portions of the flexible electrical conductor means.

According to an embodiment of the invention, the hinge body component may have a distinct applicable shape. The shape of the hinge body component may be one out of a group of possible shapes including at least U-shape, I-shape, C-shape, S-shape, L-shape, J-shape, V-shape or any variation of those. Correspondingly, the above defined shapes of the hinge body component may define shapes of the hinge body component which become apparent in a section substantially perpendicular to a course of the flexible electrical conductor means or alternatively essentially perpendicular to at least one of the pivot axes. Moreover, the passage for accepting the flexible electrical conductor means may have a shape similar or congruent to the shape of the hinge body component. According to an embodiment of the invention, the axes are substantially parallel.

According to an embodiment of the invention, a total pivot angle results from adding individual pivot angles, about which each respective pivot axis is pivoted by pivot movement. According to an embodiment of the invention, each pivot axis allows for independent pivot movements.

According to an embodiment of the invention, the structure of the hinge body component provides for predefined bending portions corresponding to bending regions which are located at end portions of the structure of the hinge body component. The bending of the flexible electrical conductor means due to the folding casing being in any open position is obtained in those bending portions and bending regions, respectively.

According to an embodiment of the invention, the bending of the flexible electrical conductor means is obtained in a plane substantially perpendicular to the pivot axes.

According to an embodiment of the invention, the hinge mechanism further comprises an inner hinge cover component. The inner hinge cover component is adapted to fit with the hinge body component for formation of the passage adapted to accept flexible electrical conductor means. The assembly of the hinge body component and the inner hinge cover component encloses the flexible electrical conductor means for routing purposes of the flexible electrical conductor means and for protection of the flexible electrical conductor means against exterior damaging influences. Naturally, the hinge mechanism may alternatively designed so that the aforementioned hinge body component forms the inner part of the passage of the electrical conductor means and the aforementioned inner hinge cover component forms the outer part thereof.

According to an embodiment of the invention, the hinge mechanism further comprises a set of brackets which are adapted for being fixed to either of the at least two casing parts and to engage in the hinge body component such that the pivot axes are established thereby.

According to an embodiment of the invention, the brackets have journal members, which engage in journal acceptance members that are provided by the hinge body component to establish the pivot axes.

According to an embodiment of the invention, the flexible electrical conductor means are freely movable within the hinge mechanism. The ability for free movement enables for compensation of change in the length of the flexible electrical conductor means, which may be caused by bending thereof due to pivot movement of the folding casing.

According to an embodiment of the invention, the flexible electrical conductor means are routed substantially tangential relative to the end portions of the hinge body component in a close position of the folding casing.

According to an embodiment of the invention, the flexible electrical conductor means are routed substantially at individual bending angles against the end portions of the hinge body component in any open position of the folding casing. The individual bending angles of the flexible electrical conductor means are substantially equal to the individual pivot angles about the pivot axes.

According to an aspect of the invention, an electric device is provided which has a folding casing constituted by at least two casing parts. The at least two casing parts are pivoted joined by a hinge mechanism. The hinge mechanism comprises at least a hinge body component and flexible electrical conductor means for connecting electric components included by different casing parts. The hinge body component comprises two independent at predefined distance spaced pivot axes. Further the hinge body component provides a passage, which is designed and adapted to receive the flexible electrical conductor means for being routed though the hinge mechanism from one casing part to the other casing part. When the folding casing is in any open position (i.e. not closed) the flexible electrical conductor means comprises two bending portions within which the flexible electrical conductor means are bent corresponding to the pivot movement about the pivot axes. Especially, a bending of the flexible electrical conductor means caused by pivot movement of the folding casing may exclusively occur within the aforementioned two bending portions of the flexible electrical conductor means.

According to an embodiment of the invention, the hinge body component may have a distinct applicable shape. The shape of the hinge body component may be one out of a group of possible shapes including at least U-shape, I-shape, C-shape, S-shape, L-shape, J-shape, V-shape or any variation of those. Correspondingly, the above defined shapes of the hinge body component may define shapes of the hinge body component which become apparent in a section substantially perpendicular to a course of the flexible electrical conductor means or alternatively essentially perpendicular to at least one of the pivot axes. Moreover, the passage for accepting the flexible electrical conductor means may have a shape similar or congruent to that shape of the hinge body component. According to an embodiment of the invention, the axes are substantially parallel.

According to an embodiment of the invention, a total pivot angle results from adding individual pivot angles, about which each respective pivot axis is pivoted by pivot movement. According to an embodiment of the invention, each pivot axis is allowed for independent pivot movements.

According to an embodiment of the invention, the structure of the hinge body component provides for predefined bending portions corresponding to bending regions which are located at end portions of the structure of the hinge body component. The bending of the flexible electrical conductor means due to the folding casing being in any open position is obtained in those bending portions and bending regions, respectively.

According to an embodiment of the invention, the bending of the flexible electrical conductor means is obtained in a plane substantially perpendicular to the pivot axes.

According to an embodiment of the invention, the hinge mechanism further comprises an inner hinge cover component. The inner hinge cover component is adapted to fit with the hinge body component for formation of the passage adapted to accept flexible electrical conductor means. The assembly of the hinge body component and the inner hinge cover component encloses the flexible electrical conductor means for routing purposes of the flexible electrical conductor means and for protection of the flexible electrical conductor means against exterior damaging influences. Naturally, the hinge mechanism may alternatively designed so that the aforementioned hinge body component forms the inner part of the passage of the electrical conductor means and the aforementioned inner hinge cover component forms the outer part thereof.

According to an embodiment of the invention, the hinge mechanism further comprises a set of brackets which are adapted for being fixed to either of the at least two casing parts and to engage in the hinge body component such that the pivot axes are established thereby.

According to an embodiment of the invention, the brackets have journal members, which engage in journal acceptance members that are provided by the hinge body component to establish the pivot axes.

According to an embodiment of the invention, the flexible electrical conductor means are freely movable within the hinge mechanism. The ability for free movement enables for compensation of change in the length of the flexible electrical conductor means, which may be caused by bending thereof due to pivot movement of the folding casing. Moreover, the free movement supports an easier assembly of connectors of the flexible electrical conductor means in addition.

According to an embodiment of the invention, the flexible electrical conductor means are routed substantially tangential relative to the end portions of the hinge body component in a close position of the folding casing.

According to an embodiment of the invention, the flexible electrical conductor means are routed substantially at individual bending angles against the end portions of the hinge body component in any open position of the folding casing. The individual bending angles of the flexible electrical conductor means are substantially equal to the individual pivot angles about the pivot axes.

According to an embodiment of the invention, the electric device is a portable electric terminal device.

BRIEF DESCRIPTION OF THE DRAWINGS

The accompanying drawings are included to provide a further understanding of the present invention and are incorporated in and constitute a part of this specification. The drawings illustrate embodiments of the present invention and together with the description serve to explain the principles and inventive concept of the invention without limiting thereto. In the drawings.

FIG. 2b illustrates schematically in detail an enlarged view of a first component of the hinge mechanism shown in FIG. 2a;

FIG. 2c illustrates schematically in detail an enlarged view of a second component of the hinge mechanism shown in FIG. 2a;

FIG. 2d illustrates schematically in detail an enlarged view of a third component of the hinge mechanism shown in FIG. 2a;

FIG. 3b illustrates a perspective sectioned view of the hinge mechanism depicted in FIG. 3a;

FIG. 4b illustrates a perspective sectioned view of the hinge mechanism depicted in FIG. 4a.

DETAILED DESCRIPTION

Figure 1:
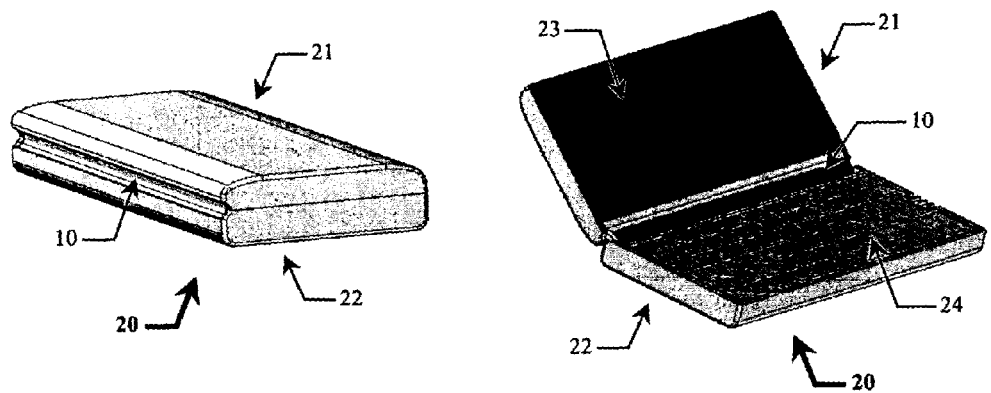
FIG. 1 shows illustratively an electronic device in a closed and an open state, which is constituted by two casing halves joined together with a hinge mechanism according to an embodiment of the invention.

In the drawings, similar and same components and elements of the hinge mechanism according to an embodiment of the invention will be indicated by same reference numerals to enhance the intellectability of the description. Reference numeral descriptions are present in Table 1 at the end of this description.

The present invention relates to electric devices, electronic devices, terminals, and the like which are designed with a folding casing being constituted of at least two casing parts which are pivoted joined with a hinge mechanism. The electric device shall particularly comprise any microprocessor-based terminal such as portable computers (laptop-sized, notebook-sized, sub-notebook-sized computers), portable personal digital assistants (PDAs), portable personal digital organizers, mobile communications enabled terminals, i.e. for instance mobile phones, mobile communicators, mobile communications enhanced PDAs and any portable terminal of similar types which may also include gaming devices by way of illustration. The above given enumeration of possible electric/electronic devices is not to be understood as limiting but illustrative.

FIG. 1 shows illustratively one distinct type of the aforementioned selection of electronic devices, into which a hinge mechanism according to the invention is implementable. The illustration in FIG. 1 depicts two views of the electronic device 20, the electronic device 20 in a close position and the electronic device 20 in an open position. In accordance with the inventive concept, which refers to a hinged junction of at least two casing parts, the electronic device 20 is constituted by a main body and a top body which are enclosed in a first main casing 22 and a second top casing 21.

The lift-sided depiction of the electronic device 20 depicts the close position of the folding casing, whereas the right-sided depiction of the electronic device 20 depicts the open position of the folding casing. The depicted embodiment of the electronic device 20 have implemented an keyboard in the main casing 22 and a display in the top casing 21, the implementation of which corresponds to the conventional arrangement but the invention is not to be understood as limited thereto. In the open position, both the display 23 and the keyboard 24 (i.e. keyboard 24 as a way of illustration representing operating means operable by a user) are presented to a user of the electronic device 20. In the close position the display 23 and the keyboard 24 are to be found adjacent to each other, covered by the top casing. Not illustrated but also possible, one or more supplementary components such as a second display additional key, keypads, keyboards etc. may be arranged in or on the top and body casings, respectively, such that these supplementary components are exhibited to a user in the close position.

Due to distributed arrangement of the aforesaid components (i.e. at least the displaying and operating components) between the different casing halves electric conduction is obviously required between electronics implemented in the main casing and the top casing. The top and main casing are joined together via a hinge mechanism 10 according to an embodiment of the present invention. The hinge mechanism is visible in the depiction of the electronic device 20 in the close position the in form of a hint and accordingly indicated by the reference numeral 10. Due to these constructional constraints, the electric conduction has to be arranged in some way with the hinge mechanism, the appropriate design of which is subject of the present invention.

Figure 2A:
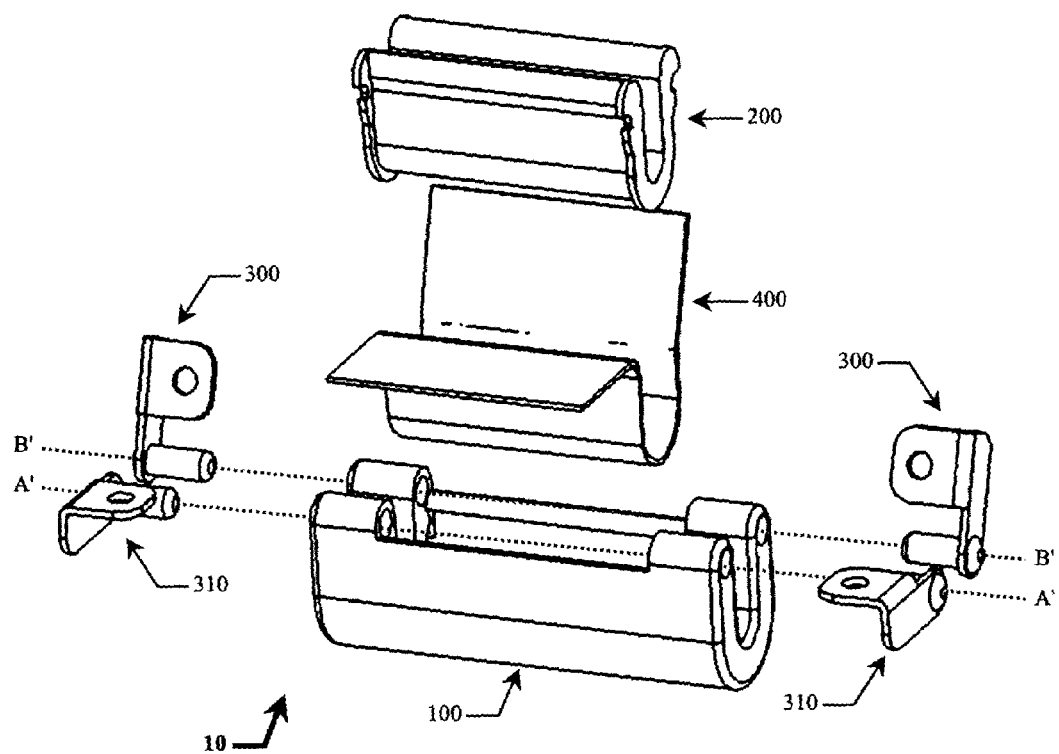
FIG. 2a illustrates schematically a perspective exploded view depicting components of the hinge mechanism according to an embodiment of the invention.

FIG. 2a illustrates schematically components of the hinge mechanism according to an embodiment of the invention in a perspective exploded view. The illustrated embodiment of the inventive hinge mechanism 10 comprises at least a set of bracket components 300, 310, a hinge body component 100 and an inner hinge cover component 200 to allow a routing of electric conductors, herein embodied as a flexible printed circuit (FPC) 400, through the hinge mechanism 10 according to an embodiment of the invention.

The depicted exploded view indicates that the flexible printed circuit (FPC) 400, which represents illustratively an electrical conduction in a non-limiting way allowing for several electric conductors interconnecting electronics enclosed in the different casing halves of the electronic device 20 of FIG. 1, is interposed between the inner hinge cover component 200 and the hinge body component 100 of the hinge mechanism according to the illustrated embodiment. The assembly of the inner hinge cover component 200 and the hinge body component 100, accompanying the flexible printed circuit (FPC) 400, is pivoted articulated with bracket components 300 and 310, which engage in journal acceptance members of the hinge body component 100. A pair of bracket components 300 is designed for acceptance by a first casing half, for instance the top casing 21 of the electronic device 20 embodied in FIG. 1, and a pair of bracket components 310 is designed for acceptance by a second casing half, for instance the main casing 22 of the electronic device 20 embodied in FIG. 1. Correspondingly, the pairs of bracket components 300, 310 that engage in the hinge body component 100 of the hinge mechanism 10 according to an embodiment of the invention define two pivot axis: the first pivot axis A'—A' and the second pivot axis B'—B'. The obtainable total pivot angle of the embodied hinge mechanism 10 results from the summation of the individual pivot angles about the pivot axes A'—A', B'—B'. In accordance with the two established pivot axes A'—A', B'—B', the hinge mechanism 10 may be designated as double articulated hinge mechanism 10.

The inner hinge cover component 200 and the hinge body component 100 serve among others as protection against injuring effects on the flexible printed circuit (FPC) 400 caused from the exterior of the embodied hinge mechanism 10. Moreover, the U-like shape of the hinge body component 100 as well as inner hinge cover component 200 serves to impose a U-shaped course of that part the flexible printed circuit (FPC) 400, which is enclosed by the hinge body component and inner hinge cover component 100, 200. The U-like shape of the hinge body component 100 as well as inner hinge cover component 200 as well as the U-like shaped course of the interposed part of the flexible printed circuit (FPC) 400 is visible in a section through them essentially particular to the directions of the pivot axes A'—A', B'—B' described above.

Those skilled in the art shall appreciate that the substantially U-shaped hinge body component 100, the substantially U-shaped inner hinge cover component 200 and the consequently substantially U-shaped passage formed by the hinge body component 100 and the inner hinge cover component 200 for accepting the flexible printed circuit (FPC) 400 illustrate one possible shape out of a plurality of shapes applicable to the components 100 and 200. As aforementioned, the shapes of the components 100 and 200 may alternatively have one out of a group comprising at least an I-shape, C-shape, S-shape, L-shape, J-shape, V-shape or any variation of those. The present invention shall not be limited to any distinct shapes of the components 100 and 200 as well as to any distinct shape of the passage formed thereby.

Furthermore, the pivot axis A'—A' and the pivot axis B'—B' are illustrated as two independent at predefined distance spaced axes which are arranged substantially parallel to each other. It shall be noted that the substantially parallel arrangement of the axes A'—A', B'—B' is just illustrative and the present invention is not limiting thereto.

The following FIG. 2*b* to FIG. 2*d* illustrate schematically in detail enlarged views of the inner hinge cover component 200, the hinge body component 100 and two bracket components 300, 310 of embodiment of the hinge mechanism shown in FIG. 2*a*.

Referring to FIG. 2*b*, the U-shaped inner hinge cover component 200 is shown in an enlarged perspective view. In detail, the U-shaped inner hinge cover component 200 has an inside surface 230, an outside surface 220 and two side surfaces 210. The U-shaped inner hinge cover component 200 is designed to fit into the hinge body component 100, which will be described in detail with reference to FIG. 2*c*. The inside surface 230 of the U-shaped inner hinge cover component 200 faces towards the flexible printed circuit (FPC) 400, which represents a specific electrical conduction routed through the hinge mechanism 10 according to an embodiment of the invention.

Referring to FIG. 2*c*, the U-shaped hinge body component 100 is shown in an enlarged perspective view. In detail, the U-shaped hinge body component 100 has journal acceptance members 110 at each side and at each end of the U-shaped hinge body component 100 such that four journal acceptance members 110 are present in the U-shaped hinge body component 100. The four journal acceptance members 110 engage in the two pairs of bracket components, each pair of which is provided for being mounted to one respective casing part (casing half) of the folding casing of the electronic device 20. According to the depicted embodiment of the hinge mechanism 10, the journal acceptance members 110 form journal acceptance elements 115, which are adapted to accept engaging journal members and pivot members 330, respectively, to enable a pivoted mounting of the bracket components 300, 310.

Further, the U-shaped hinge body component 100 has an outside surface 140 and an inside surface 130, which faces towards the flexible printed circuit (FPC) 400 and consequently towards the inside surface 230 of the U-shaped inner hinge cover component 200.

The outside surface 140 of the U-shaped hinge body component 100 and the inside surface 220 of the U-shaped inner hinge cover component 200 form the protective encasing of the hinge mechanism 10 according to an embodiment of the invention to protect the electrical conduction (i.e. the flexible printed circuit; FPC, 400) embedded between the U-shaped hinge body component 100 and the U-shaped inner hinge cover component 200 against accidental injury from the external, respectively.

The U-shaped inner hinge cover component 200 is inserted into the U-shaped hinge body component 100 during assembly of the hinge mechanism 10 according to an embodiment of the invention. The assembly procedure is indicated by the assembly direction axes C'. The side surface 210 of the U-shaped inner hinge cover component 200 slides during assembly against the inner side surface 150 of the U-shaped hinge body component 100. The dimensions of the U-shaped inner hinge cover component 200 and the U-shaped hinge body component 100 are designed for fitting and the free play of the fitting components 100 and 200 may be provided for sliding and static friction for tight mounting. The conjunction of the U-shaped inner hinge cover component 200 and the U-shaped hinge body component 100 is provided with four press-fit junctions 250 which locks the hinge cover component 100 to grooves 170 on inside surface 130 of the U-shaped hinge body component 100. During the assembly the inner hinge cover component 200 deforms.

Referring now to FIG. 2*d*, bracket components 300, 310 for mounting the casing halves 21, 22 to the hinge mechanism according to an embodiment of the invention are shown. The bracket components 300 and 310 are designed similarly but mirror-inverted to each other for enabling mounting to the casing halves. The bracket component 300, 310 is formed from a journal element and pivot element 330, respectively, a mounting member 320 with an integrated fixing element 350 which is herein for instance implemented as hole e.g. for accepting a pin-or screw-like element. The pivot element 330 is linked to the mounting member 320 via a linking passage member 340. The bracket component 300, 310 may be manufactured as one piece or may be assembled e.g. the pivot member 330 may be tightly integrated into the one-piece part constituting the linking passage member 340 and the mounting member 320.

The journal member and pivot member 330 may be realized as a projecting pin element which engages into the journal acceptance element 115 of the hinge body component 100, where the journal acceptance element 115 is realized as a pin accepting hole-like structure. The projecting pin structure of pivot element 330 of the bracket component 300, 310 and the counterpart pin accepting hole-like structure of the journal acceptance element 115 is just one of several possibilities of the design of the hinge mechanism 10 according to embodiments of the invention and the invention shall not be limited to this specifically stated solution. Alternatively, the bracket component 300, 310 may be provide with a journal acceptance element, into which a projecting pin element engages, which is formed at the hinge body component 100 of the hinge mechanism 10 according to an alternative embodiment not illustrated in the drawings accompanying the present invention. Those skilled in the art will understand that the realization of the pivot axes A'—A' and B'—B', which are relevant for the inventive concept upon which the present invention is based, may be obtained in several different but functionally analogous ways.

In case of realizing the engagement of the bracket components 300, 310 and the hinge body component 100 with the means of projecting pin elements and pin acceptance elements such as illustrated in the embodiment shown in FIG. 2*d* the integration of the of these elements of the above-stated type may be obtained by a press-fit mechanism, which allows for omitting supplementary fixing elements. The press-fit mechanism guarantees that once the assembly of the engaging elements has been performed the bracket components 300, 310 and the hinge body component 100 are fixed to each other but still allow for pivoting movements as required for the folding casing.

Moreover, the above presented realization of the engagement by the means of projecting pin elements and pin acceptance elements may be further performed such that the free play between the engaging elements, which are enabled for pivoting against each other, has a predefined dimension. The predefined free play therebetween provide for a correspondingly predefined sliding friction effected from the sliding of the engaging elements against each other during pivoting movements and provides for a correspondingly predefined static friction in parallel. The static friction has to be present for maintaining a certain pivot angle, which has been set by a user by pivoting movement. With respect to FIG. 1, the maintenance of a set pivot angle may be limited by pivot stop means at a maximal pivot angle when the folding casing of the electronic device 20 is completely opened, i.e. has obtained the maximally allowed pivot angle. When the folding casing is opened about pivot angles below the maximal pivot angle the static friction guarantees for maintaining the actually selected pivot angle, which comprises a maintaining of this selected pivot angle against a pivoting force caused by the weight of the top casing being applied by the effecting gravity.

The static as well as the sliding friction provides for robust, solid, reliable etc. feeling of the mechanical response of the hinge mechanism 10 according to an embodiment of the invention given by the handling of a folding casing, especially given during the pivot movement of the hinge mechanism and during movement of the casing parts. The conveyed feeling of the handling of folding casing is an essential feature for customers, which check the electronic device with the folding casing for the first time.

With reference to FIG. 2d and FIG. 2c, the engaging elements are the journal element and pivot element 330, respectively, and the journal acceptance element 110. The static friction is caused from the tidy adjacent arrangement of the surfaces of the elements 330 and 110 and the sliding friction is caused by the sliding of these surfaces against each other. A more detailed description of the hinge mechanism assembled from the aforementioned components according to an embodiment of the invention will be given in accordance with perspective views of the hinge mechanism 10 in the closed and open position, respectively. Especially the advantages of the U-like shaped components with reference to the objects of the present invention will be understood in conjunction with the following statement.

Due to the complexity of the perspective illustrations, it has been relinquished to mark all components as well as members and elements thereof with reference numerals, respectively. But those skilled in the art will appreciate to recognize and identify the aforementioned components, members and elements depicted in FIG. 2a to FIG. 2d and described in detail with reference thereto.

Figure 3A:
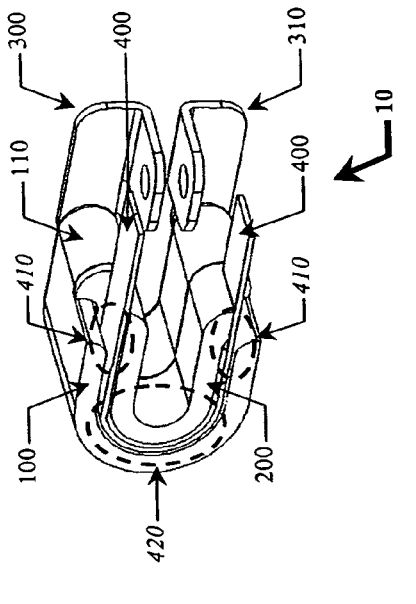
FIG. 3a illustrates a perspective view of a hinge mechanism in a close position according to an embodiment of the invention.
Figure 3B:
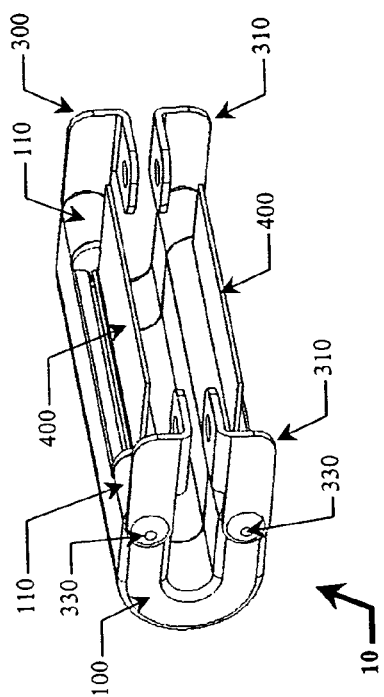

FIG. 3a and FIG. 3b illustrate a perspective view and a perspective sectioned view of a hinge mechanism in a close position according to an embodiment of the invention, respectively.

The perspective views allow for anticipation of the arrangement of the hinge mechanism 10 according to an embodiment of the invention, where in detail the inner hinge cover component 200 is arranged by insertion in the hinge body component 100. In-between both the inner hinge cover component 200 and the hinge body component 100 there is positioned the flexible printed circuit (FPC) 400, which represents the electrical conduction routed through the hinge mechanism 10 according to an embodiment of the invention. The pairs of bracket components 300, 310, which serve for mounting the hinge mechanism 10 to the casing halves, i.e. for instance the main casing 22 and the top casing 21 of electronic device 10, are inserted by the means of their journal members 330 of the bracket components 300, 310 into the respective journal acceptance members 110 of the hinge body component 100. The bracket components 300, 310 engaging into the hinge body component 100 establish the first and second pivot axes, which allow for pivot movements as stated above with respect to FIG. 1 and the embodied electronic device 20 thereof.

In particular the perspective sectioned view allows for recognizing the traversing of the flexible printed circuit (FPC) 400 through the hinge mechanism according to an embodiment of the invention. It will be appreciated that the flexible printed circuit (FPC) 400 is routed through the protecting hinge body component 100 and inner hinge cover component 200 with a predefined free play. The predefined free play in-between both the U-shaped hinge body component 100 and the U-shaped inner hinge cover component 200 forms a slit-like U-shape passage, which enables for accommodating the flexible printed circuit (FPC) 400. The slit-like U-shape passage is especially suitable for accommodating essentially two-dimensional flat electric conductor arrangements such as strip-like, sheet-like, etc. conductor arrangements e.g. the flexible printed circuit (FPC) 400.

As aforementioned, the U-shaped structures of the hinge body component 100 and the inner hinge cover component 200 refer to the design of the components in a direction substantially perpendicular to the pivot axes (cf. FIG. 2a, axes A'—A' and B'—B'). An analogous definition is valid for the U-shaped structure of the identified slit-like U-shape passage adapted for accepting the flexible printed circuit (FPC) 400.

The depictions of FIG. 3a and FIG. 3b correspond to a minimal pivot angle, which occurs when the folding casing is in its close position. Consequently, the flexible printed circuit (FPC) 400 is routed tangentially into the slit-like U-shape passage. That means routed from/to the electronics included in the respective casing half, tangential to the surface of the hinge body component 200 at the positions of the end portions of the U-shape structure or at the positions of the apertures of the slit-like U-shaped passage and essentially parallel to the mounting members 320 of the bracket components 300, 310. The flexible printed circuit (FPC) 400 is forced to bend about an angle defined by the U-shape structure of the passage which is in turn defined by the inner hinge cover component 200 and the hinge body component 100, wherein the bending angle may be about 180°, substantially. The region, within which the flexible printed circuit (FPC) 400 is forced to bend, is indicated with reference numeral 420, which may be denoted as permanent bending region. Normally because of the end portions of a U-shape structure being substantially parallel to each other the bending angle of about 180° results therefrom. But it shall be understood that the bending angle may differ therefrom and that the invention is not limited to any specific bending angle. The exact U-shape structure of both the inner hinge cover component 200 and the hinge body component 100 depend on the exact design of the respective casing part adjoining the cover components 100 and 200, respectively.

Figure 4A:
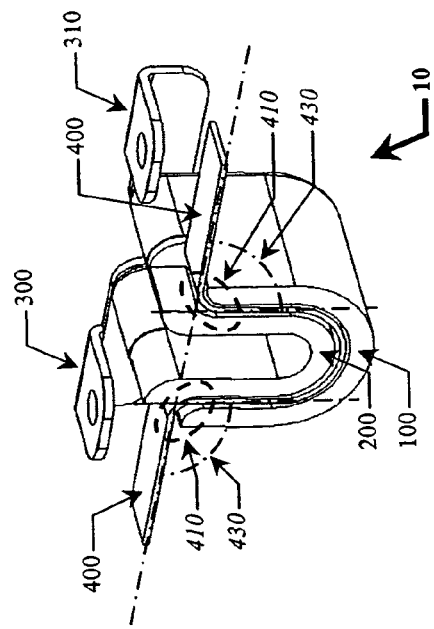
FIG. 4a illustrates a perspective view of a hinge mechanism in an open position according to an embodiment of the invention.
Figure 4B:
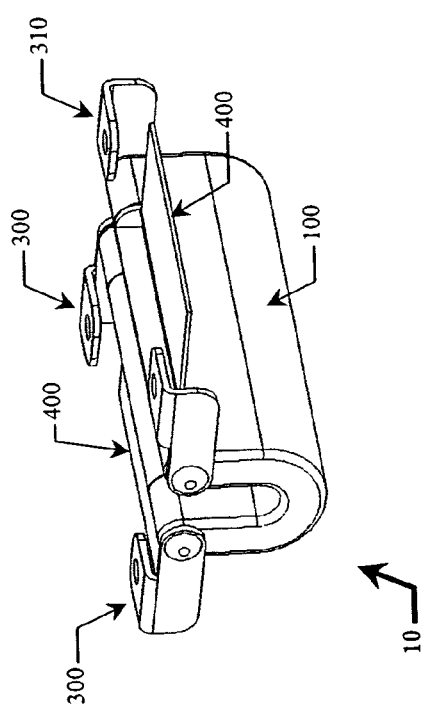

FIG. 4a and FIG. 4b illustrate a perspective view and a perspective sectioned view of a hinge mechanism in an open position, respectively, according to an embodiment of the invention.

Again, the perspective views allow for anticipation of the arrangement of the hinge mechanism 10 according to an embodiment of the invention, where in detail the inner hinge cover component 200 is arranged by insertion in the hinge body component 100. In-between both the inner hinge cover component 200 and the hinge body component 100 the slit-like U-shaped passage is constituted for accommodating the flexible printed circuit (FPC) 400.

The pairs of bracket components 300, 310, which serve for mounting the hinge mechanism 10 to the casing halves, i.e. for instance the main casing 22 and the top casing 21 of electronic device 10, differs in their positions relative to the cover components 100 and 200, respectively, which results from a pivoting movement about the both pivot axes A'—A' and B'—B'. The depicted positions of the bracket components 300, 310 may allow to identify a total pivot angle of approximately 180°, that means each pivot axes A'—A' and B'—B' is pivoted about an angle 430 of approximately 90°. The total pivot angle results from a summing interaction of the respective pivot angles, about which the respective individual axes have been pivoted. It is recognized from the FIG. 4a and FIG. 4b that the individual pivot angles of the axes A'—A' and B'—B' are substantially the same individual angle 430. It shall be appreciated that the individual pivot angle 430 of each respective axis A'—A' or B'—B' may differ from each other, a symmetrical pivot movement about the axes A'—A' and B'—B' is not necessary. Nevertheless, the total pivot angle results from a summation of the individual pivot angles 430. Moreover, a specific embodiment of the present invention has a maximum total bending angle of about 180° and the maximum individual bending angles achieve consequently about 90° as a symmetric bending movement about each pivot axis A'—A' and B'—B' is assumed, respectively. Bending angle in FIG. 1 is limited by the ability of pivot movement of the two casings 21 and 22. Indeed the bending angles are not limited by the presented hinge mechanism 10 itself.

The regions, in which the embedded flexible printed circuit (FPC) 400 bends, is restricted to limited regions. These limited regions will be denoted as temporary bending region 410, which shall emphasize the contrast to the permanent bending region 420 that is defined by the U-shape structure of the cover components 100 and 200. The embedded flexible printed circuit (FPC) 400 is bend within the temporary bending regions 410 in accordance with the pivot movements about the pivot axes A'—A' and B'—B', respectively. The temporary bending regions 410 are situated at end portions of the U-shape inner and hinge body components 200 and 100, respectively. The presents of two bending regions 410 has the advantage that the bending of the flexible printed circuit (FPC) 400 due to pivot movements is divided into spaced apart and separate bending regions. The stain resulting form the pivot movements is consequently separated onto that parts of the flexible printed circuit (FPC) 400 which are situated in the temporary bending regions 410. In further consequence that means that the bending strain, which may effect damages to the flexible printed circuit (FPC) 400, is divided among two bending regions 410 causing a reduction of the bending strain within each respective bending region 410 in comparison with only one bending region as known in the art and state of the art.

A free play between the hinge body component 100 and the inner hinge cover component 200, which constitute the slit-like U-shaped passage that is adapted to accommodate the flexible printed circuit (FPC) 400, is further designed in such as way that the flexible printed circuit (FPC) 400 is movable at least at a minimal required extent. A pivot movement of the hinge mechanism 10 according to an embodiment of the present invention may cause a shortening of the flexible printed circuit (FPC) 400 due to the bending of the flexible printed circuit (FPC) 400 within the bending regions 410 in particular to a larger pivot angle. The dimensions and in particular height of the slit-like U-shaped passage (i.e. the height being the dimension perpendicular to the surface of strip-like and sheet-like the flexible printed circuit (FPC) 400, respectively) is provided such that a moving of the flexible printed circuit (FPC) 400 may compensate for the shortening resulting from bending in the bending regions 410. Vice versa, the dimensions and in particular height of the slit-like U-shaped passage analogously provides for compensation of extensions resulting from bending movements causing bending in the bending regions 410 in particular to a smaller pivot angle. The maximal shortening may be reached at the maximal pivot angle (i.e. corresponding to a totally opened folding casing) and hence the maximal extension may be reached at the minimal pivot angle (i.e. corresponding to a totally closed folding casing).

Figure 5:
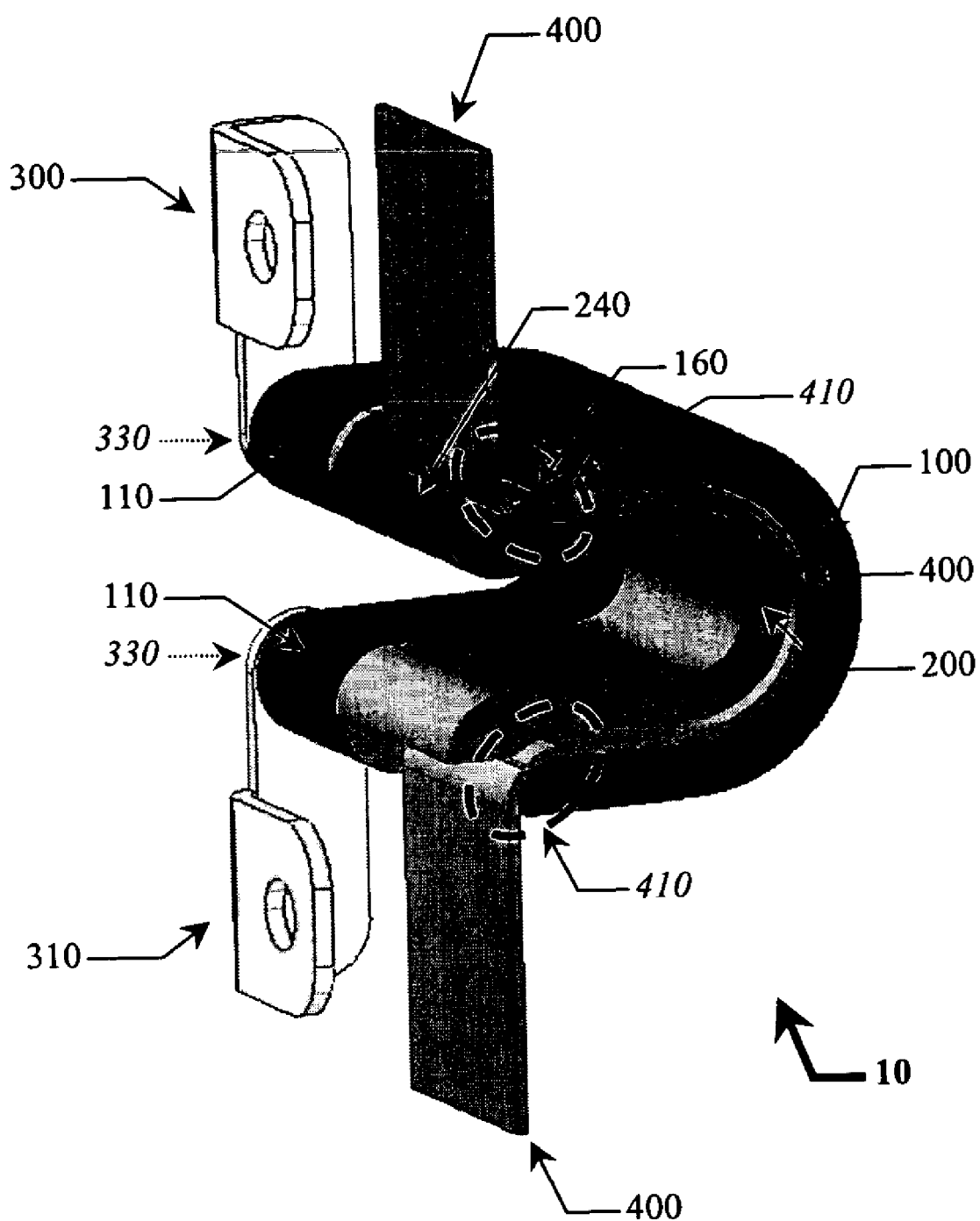
FIG. 5 illustrates an enlarged perspective sectioned view of a hinge mechanism in an open position according to an embodiment of the invention.

FIG. 5 illustrates an enlarged perspective sectioned view of a hinge mechanism in an open position according to an embodiment of the invention. The enlarged perspective sectioned view corresponds to the perspective sectioned view shown in FIG. 4b and described in detail with reference thereto.

Referring to FIG. 5a rounded FPC acceptance surface 160 and a tangential flat FPC acceptance surface 240 is marked. Although the rounded FPC acceptance surface 160 and the tangential flat FPC acceptance surface 240 have only been identified at one end of the U-shaped inner hinge cover component 200 and U-shaped hinge body component 100, those skilled in the art will appreciate that the structural shapes of the inner hinge cover component 200 and hinge body component 100 are symmetrical to a mirror plane, which is essentially centrally positioned to the U-shaped inner hinge cover component 200 and hinge body component 100 and which is substantially parallel to the pivot axes A'—A' and B'—B'. Conclusively, the analogous structured surfaces, which are marked as rounded FPC acceptance surface 160 and tangential flat FPC acceptance surface 240 at one of the U-shaped end portions of the cover components 100 and 200 are also present at the other one of the U-shaped end portions thereof.

The rounded FPC acceptance surface 160 serves to guide the flexible printed circuit (FPC) 400 when bent to an open position as a result of pivot movement of the hinge mechanism 10 according to an embodiment of the invention as illustrated in FIG. 5. Particularly, the rounded FPC acceptance surface 160 serves at least to limit the radius of bending to a minimal bending radius as the flexible printed circuit (FPC) 400 is bent to its maximum individual bending angle 430 referred to in FIG. 4b. As aforementioned, that means that the hinge mechanism 10 according to an embodiment is in an open position. In consequence of limiting the bending radius to a minimal bending radius the bending stress is also limited thereby. Damages and in particular breakage due to a bending of the flexible printed circuit (FPC) 400 with a bending radius that is too small are prevented by support of the flexible printed circuit (FPC) 400 within the temporary bending region 410 by the rounded FPC acceptance surface 160, onto which the flexible printed circuit (FPC) 400 is allowed for lying tightly.

The tangential flat FPC acceptance surface 240 serves to guide flexible printed circuit (FPC) 400 when the hinge mechanism according to an embodiment of the invention is in its close position, in which the flexible printed circuit (FPC) 400 is routed substantially tangential to the end portions of the U-shaped cover components 100 and 200, respectively. That means, the flexible printed circuit (FPC) 400 is routed substantially straight and unbent within the temporary bending regions 410, respectively. The flexible printed circuit (FPC) 400 is allowed for lying tightly on the tangential flat FPC acceptance surface 240.

The pivot movements of the hinge mechanism 10 according to an embodiment of the invention may be limited by pivoting stop elements (not shown). Such pivoting stop elements may be attached to, integrated into or mounted to the bracket components 300, 310 of the hinge mechanism 10 such that for instance the pivoting stop elements get into contact with the hinge body component 100 as the maximal individual pivot angle about the respective pivot axis A'—A' and B'—B' is obtained by a pivot movement, respectively. Alternatively the casing parts of the folding casing may be designed in conjunction with the design of the hinge body component of the hinge mechanism 10 according to an embodiment of the invention such that a respective casing part get into contact with the hinge body component 100 as the maximal individual pivot angle about the respective pivot axis A'—A' and B'—B' is obtained by a pivot movement, respectively.

The freely movable flexible printed circuit (FPC) 400 within the hinge mechanism 10 according to an embodiment of the invention may be uncoupled from a connection of the flexible printed circuit (FPC) 400 to electronics integrated in the respective casing parts of the folding casing. The uncoupling may be necessary in order to prevent stress effecting such connections of the flexible printed circuit (FPC) 400 to electronics resulting from moving of the flexible printed circuit (FPC) 400 due to pivot movements, which may occur in consequence on the bending of the flexible printed circuit (FPC) 400 within the temporary bending regions 410. Hence, strain relieves (not shown) may be integrated into the casing parts. As a result, the flexible printed circuit (FPC) 400 is movable freely within the hinge mechanism 10, through which the flexible printed circuit (FPC) 400 is routed and the required uncoupling may be obtained thereby.

Moreover, electronics is typically liable to electrostatic danger, which is normally denoted as ESD. Electrostatic charges may be conveyed by flexible printed circuit (FPC) 400 to the electronics connected thereby and damages may result therefrom. Precautions should be taken to prevent such electrostatic danger due to conveyance of electrostatic charges. With reference to the hinge mechanism 10, and especially the hinge body component 100 and the inner cover component 200, respectively, according to an embodiment of the invention a suitable selection of the material from which the hinge mechanism 10 is to be produced may reduce the ESD sufficient. Suitable selection of material may comprise a polymer material, which is resistant against electrostatic charging, or the material used for the hinge mechanism 10 may be coated with a suitable coating at least in regions which may get in contact with the flexible printed circuit (FPC) 400 in order to prevent electrostatic charging.

Protrusions at the outside of the folding casing as often existing in conjunction with conventional hinge mechanism are interfering for a user of the folding casing and reduce the total usability thereof. Referring back to FIG. 1 under the aspect of the design of the hinge mechanism 10 according to an embodiment of the invention, of which perspective example illustrations are shown in FIG. 3a to FIG. 4 protrusions are omitted by the design of the inventive hinge mechanism 10. The elements and components responsible for pivot function of the inventive hinge mechanism are either included in and covered by the hinge mechanism 10 itself, respectively, or integrated into the casing parts of the folding casing of the electric device 20 (cf. for instance the bracket components 300, 310). The appearance and shape of the hinge mechanism 10, i.e. parts of the hinge mechanism 10, which is reachable from exterior of the hinge mechanism 10, is substantially smooth especially there are not any projections, protrusions etc. which are required for realizing the purposed inventive hinge mechanism 10.

Although the invention has been described with reference to particular embodiments thereof, it will be apparent to those ordinarily skilled in the art that modifications and variations to the described embodiments my be made without departing from the scope of the present invention, which is accordingly defined only by the claims appended.

TABLE 1

Reference numerals

| | | |
|---|---|---|
| 10 | (double articulated U-shaped) hinge mechanism | |
| 20 | electronic device with folding case | |
| 21 | (second) top casing | |
| 22 | (first) main casing | |
| 23 | display | |
| 24 | keyboard | |
| 100 | hinge body component | |
| 110 | journal acceptance member | |
| 115 | journal acceptance element | |
| 120 | inside surface | (of hinge body component 100) |
| 130 | outside surface | (of hinge body component 100) |
| 140 | outer side surface | (of hinge body component 100) |
| 150 | inner side surface | (of hinge body component 100) |
| 160 | rounded FPC acceptance surface | (of hinge body component 100) |
| 170 | locking groove element | (of hinge body component 100) |
| 200 | inner hinge cover component | |
| 210 | side surface | (of inner hinge cover component 200) |
| 220 | outside surface | (of inner hinge cover component 200) |
| 230 | inside surface | (of inner hinge cover component 200) |
| 240 | tangential (flat) FPC acceptance surface | (of inner hinge cover component 200) |
| 250 | locking element | (of inner hinge cover component 200) |
| 300 | bracket component | |
| 310 | bracket component | |
| 320 | (casing) mounting member | |
| 330 | journal member/(engaging) pivot member | |
| 340 | linking passage member | |
| 350 | (casing) fixing element | |
| 400 | flexible printed circuit (FPC) | |
| 410 | temporary bending region | |
| 420 | permanent bending region | |
| 430 | (individual) bending angle | |
| A' | first pivot axis | |
| B' | second pivot axis | |
| C' | assembly direction axis | |

The invention claimed is:

1. A hinge mechanism, for a folding casing of an electronic device consisting of at least two casing parts, each of said casing parts including electronic components, comprising:

at least one hinge body component that is unitary and fixed relative to the at least two casing parts, the at least one hinge body component having a first end and a second end separated by a predefined distance; and flexible electrical conductor means for connecting said electronic components included by different one of the at least two casing parts;

wherein said at least one hinge body component is pivotally attached via a first bracket from said one end of the hinge body component to the first of the at least two casing parts and is also pivotally attached via a second bracket from said second end of the at least one hinge body component to the second of the at least two casing parts; wherein said hinge body component and said first and second brackets define two pivot axes which are separated at said predefined distance so that a total pivot angle for folding the at least two casing parts results solely from summation of individual pivot angles about each of which said respective pivot axis is pivoted;

wherein when the at least two casing parts are moved along said individual pivot angles, the at least one hinge body component remains fixed relative to the casing parts; and wherein said at least one hinge body component provides a passage for accepting said flexible electrical conductor means.

2. The hinge mechanism according to claim 1, wherein each of said pivot axis is pivoted independently.

3. The hinge mechanism according to claim 1, wherein bending of said flexible electrical conductor means is obtained in a plane substantially perpendicular to said pivot axes.

4. The hinge mechanism according to claim 1, further comprising:

inner hinge cover component;

wherein said inner hinge cover component is designed to fit into said at least one hinge body component such that said at least one hinge body component in conjunction with said inner hinge cover component forms said passage and said flexible electrical conductor means is enclosed by said hinge body component and said inner hinge cover component.

5. The hinge mechanism according to claim 1, wherein said first and second brackets have journal members which interact with journal acceptance members provided in the hinge body component to establish said pivot axes.

6. The hinge mechanism according to claim 1, wherein said flexible electrical conductor means are freely movable within said hinge mechanism to allow compensation of shortening and extension of said flexible electrical conductor means caused by bending thereof due to pivoting.

7. The hinge mechanism according to claim 1, wherein said flexible electrical conductor means are routed substantially tangential to end portions of said at least one hinge body component in a close position of said folding casing.

8. The hinge mechanism according to claim 1, wherein said flexible electrical conductor means are routed substantially at bending angles against end portions of said at least one hinge body component in an open position of said folding casing; wherein said bending angles correspond to said individual pivot angles.

9. An electronic device with a folding casing being constituted by at least two casing parts including electronic components, which are joined by a hinge mechanism comprising:

at least one hinge body component that is unitary and fixed relative to the at least two casing parts, the at least one hinge body component having a first end and a second end separated by a predefined distance; and flexible electrical conductor means for connecting said electronic components included by the different one of the at least two casing parts;

wherein said at least one hinge body component is pivotally attached via a first bracket from said one end of the hinge body component to the first of the at least two casing parts and is also pivotally attached via a second bracket from said second end of the at least one hinge body component to the second of the at least two casing parts;

wherein said hinge body component and said first and second brackets define two pivot axes which are separated at said predefined distance so that a total pivot angle for folding the at least two casing parts results from summation of individual pivot angles about each of which said respective pivot axis is pivoted;

wherein when the at least two casing parts are moved along said individual pivot angles, the at least one hinge body component remains fixed relative to the casing parts; and wherein said at least one hinge body component provides a passage for accepting said flexible electrical conductor means.

10. The electric device according to claim 9, wherein each of said pivot axis is pivoted independently.

11. The electric device according to claim 9, wherein bending of said flexible electrical conductor means is obtained in a plane substantially perpendicular to said pivot axes.

12. The electric device according to claim 9, further comprising:

an inner hinge cover component;

wherein said inner hinge cover component is designed to fit into said at least one hinge body component such that said at least one hinge body component in conjunction with said inner hinge cover component form said passage and said flexible electrical conductor means is enclosed by said hinge body component and said inner hinge cover component.

13. The electric device according to claim 9, wherein said first and second brackets have journal members which interact with journal acceptance members provided in the hinge body component to establish said pivot axes.

14. The electric device according to claim 9, wherein said flexible electrical conductor means are freely movable within said hinge mechanism to allow for compensation of shortening and extension of said flexible electrical conductor means caused by bending thereof due to pivoting.

15. The electric device according to claim 9, wherein said flexible electrical conductor means are routed substantially tangential to end portions of said at least one hinge body component in a close position of said folding casing.

16. The electric device according to claim 9, wherein said flexible electrical conductor means are routed substantially at bending angles against end portions of said at least one hinge body component in an open position of said folding casing; wherein said bending angles correspond to said individual pivot angles.

17. The electric device according to claim 9 that is a portable electric terminal device.

18. A hinge mechanism, for a folding casing of an electronic device consisting of at least two casing parts, each of said casing parts including electronic components, comprising:

at least one hinge body component that is unitary and fixed relative to the at least two casing parts, the at least one hinge body component being generally U-shaped forming first and second legs with a respective first end and a second end separated by a predefined distance; and flexible electrical conductor means for connecting said electronic components included by different one of the at least two casing parts;

wherein said at least one hinge body component is pivotally attached via a first bracket from said one end of the hinge body component to the first of the at least two casing parts and is also pivotally attached via a second bracket from said second end of the at least one hinge body component to the second of the at least two casing parts;

wherein said hinge body component and said first and second brackets define two pivot axes at the end of said first and second legs, the two pivot axes being separated at said predefined distance, wherein each of the pivot axes is disposed on one of the at least two casing parts, wherein when the at least two casing parts are moved along said individual pivot angles, the at least one hinge body component remains fixed relative to the casing parts; and wherein said at least one hinge body component provides a passage for accepting said flexible electrical conductor means.

19. The hinge mechanism according to claim 18, wherein a total pivot angle results solely from summation of individual pivot angles about each of which said respective pivot axis is pivoted.

20. The hinge mechanism according to claim 18, wherein each of said pivot axis is pivoted independently.

21. The hinge mechanism according to claim 18, wherein bending of said flexible electrical conductor means is obtained in a plane substantially perpendicular to said pivot axes.

22. The hinge mechanism according to claim 18, further comprising:
  inner hinge cover component;
wherein said inner hinge cover component is designed to fit into said at least one hinge body component such that said at least one hinge body component in conjunction with said inner hinge cover component forms said passage and said flexible electrical conductor means is enclosed by said hinge body component and said inner hinge cover component.

23. The hinge mechanism according to claim 18, wherein said first and second brackets have journal members which interact with journal acceptance members provided in the hinge body component to establish said pivot axes.

24. The hinge mechanism according to claim 18, wherein said flexible electrical conductor means are freely movable within said hinge mechanism to allow compensation of shortening and extension of said flexible electrical conductor means caused by bending thereof due to pivoting.

25. The hinge mechanism according to claim 18, wherein said flexible electrical conductor means are routed substantially tangential to end portions of said at least one hinge body component in a close position of said folding casing.

26. The hinge mechanism according to claim 18, wherein said flexible electrical conductor means are routed substantially at bending angles against end portions of said at least one hinge body component in an open position of said folding casing; wherein said bending angles correspond to said individual pivot angles.

* * * * *